(12) United States Patent
Zeng (10) Patent No.: US 12,330,450 B1
(45) Date of Patent: Jun. 17, 2025

(54) PORTABLE DETACHABLE PULLEY

(71) Applicant: Guosheng Zeng, Hunan (CN)

(72) Inventor: Guosheng Zeng, Hunan (CN)

( * ) Notice: Subject to any disclaimer, the term of this patent is extended or adjusted under 35 U.S.C. 154(b) by 0 days.

(21) Appl. No.: 18/806,457

(22) Filed: Aug. 15, 2024

(51) Int. Cl.
B60B 33/00 (2006.01)

(52) U.S. Cl.
CPC ...... B60B 33/0007 (2013.01); B60B 33/0068 (2013.01); B60B 33/0078 (2013.01)

(58) Field of Classification Search
CPC ....... B60B 29/002; B60B 30/10; B60B 33/00; B60B 33/001; B60B 33/0015; B60B 33/0018; B60B 33/0002; B60B 33/0023; B60B 33/0026; B60B 33/04; B60B 33/0042; B60B 33/0044; B60B 33/0007; B60B 33/0068; B60B 33/0078; B60B 2360/104; B60B 2900/311; B60B 2900/321; B60B 2900/572; B60B 16/30; B60B 16/33; B62B 230/08; B62B 230/10
See application file for complete search history.

(56) References Cited

U.S. PATENT DOCUMENTS

| | | | | |
|---|---|---|---|---|
| 2,800,679 A | * | 7/1957 | Schultz, Jr. | ......... B60B 33/0002 16/29 |
| 3,935,613 A | * | 2/1976 | Kaneko | ............... B60B 33/0002 16/30 |
| 4,227,281 A | * | 10/1980 | Chung | ................ B60B 33/0002 16/29 |
| 4,333,207 A | * | 6/1982 | Atwood | .............. B60B 33/0078 16/35 R |
| 4,817,237 A | * | 4/1989 | Murphy | .............. B60B 33/0002 16/257 |
| 4,854,007 A | * | 8/1989 | Cheng | ................. B60B 33/0052 16/35 R |
| 5,428,866 A | * | 7/1995 | Aschow | .............. B60B 33/0002 248/223.41 |
| 7,931,284 B2 | * | 4/2011 | Chiu | .................... B60B 33/0042 16/30 |
| 8,302,256 B1 | * | 11/2012 | Spraley | ............... B60B 33/0018 16/30 |
| 8,671,519 B1 | * | 3/2014 | Spraley | ............... B60B 33/0018 16/30 |
| 9,707,802 B1 | * | 7/2017 | Abbassi | .............. B60B 33/0013 |

(Continued)

FOREIGN PATENT DOCUMENTS

CN 216886763 U * 7/2022

*Primary Examiner* — Chuck Y Mah
(74) *Attorney, Agent, or Firm* — Nitin Kaushik (57) ABSTRACT

A portable detachable pulley is provided, which includes a gasket, and a buckle assembly is provided on the lower end face of the gasket. The buckle assembly includes two symmetrically distributed first buckles fixedly mounted on the lower end face of the gasket, and a second buckle is provided between the two first buckles. The second buckle is located at an end portion of one side of the two first buckles, and a fastening component is provided at the other end portion of the two first buckles. A connecting piece is movably mounted between the first buckle and the second buckle, and a pulley assembly for rolling is provided beneath the connecting piece. The pulley is designed for use both with and without the pulley assembly, depending on circumstances, such that the processes of assembly and disassembly are highly user-friendly and do not necessitate the use of any tools.

16 Claims, 11 Drawing Sheets

(56) References Cited

U.S. PATENT DOCUMENTS

| | | | |
|---|---|---|---|
| 9,936,809 B2* | 4/2018 | Vandenham | A47B 91/16 |
| 2003/0094554 A1* | 5/2003 | Bushey | B60B 33/001 |
| | | | 248/346.11 |
| 2005/0015928 A1* | 1/2005 | Arsenault | B60B 33/0039 |
| | | | 16/300 |
| 2015/0258850 A1* | 9/2015 | Schioppa | B60B 33/025 |
| | | | 16/37 |
| 2016/0221392 A1* | 8/2016 | Steenson | B60B 33/0086 |
| 2016/0355053 A1* | 12/2016 | Warncke | B60B 33/02 |
| 2020/0331294 A1* | 10/2020 | Lai | B60B 33/0028 |

* cited by examiner

PORTABLE DETACHABLE PULLEY

TECHNICAL FIELD

The present disclosure relates to the technical field of storage accessories, and in particular to a portable detachable pulley.

BACKGROUND

Current wheel designs for household products are predominantly fixed, which may not be necessary for all use cases. The lack of disassembly options limits the versatility of these products. Additionally, the presence of non-detachable wheels contributes to less efficient packaging, resulting in a larger overall size and increased transportation costs. Furthermore, the method of securing the wheels necessitates multiple components, which are typically constructed from relatively heavy materials.

SUMMARY

In order to solve the problem mentioned in the background art, a portable detachable pulley is provided.

To solve the technical problems above, the present disclosure provides a portable detachable pulley, which includes a gasket, and a buckle assembly is provided on the lower end face of the gasket. The buckle assembly includes two symmetrically arranged first buckles fixedly mounted on the lower end face of the gasket, and a second buckle is provided between the two first buckles. The second buckle is located at an end portion of one side of the two first buckles, and a fastening component is provided at the other end portion of the two first buckles. A connecting piece is movably assembled between the first buckle and the second buckle, and a pulley assembly for rolling is provided beneath the connecting piece.

Preferably, the pulley assembly includes a fixing seat fixedly arranged at the bottom of the connecting piece, and a first connecting column rotatably embedded at the bottom of the fixing seat. A pulley housing is fixedly assembled on an end face of the first connecting column away from the fixing seat, and a center plate is fixedly arranged inside the pulley housing. A rotating shaft is rotatably inserted in the center plate, and the rotating shaft and the pulley housing are coaxially arranged. Both ends of the rotating shaft are fixedly sleeved with a roller body respectively, and a brake member is arranged between the pulley housing and the rotating shaft.

Preferably, the fastening component includes a fixing member, which may be a cross screw, a flat screw, or a bolt. The cross screw and flat screw can be directly twisted using the fingernail cover, while the bolt can be rotated by grasping it between the pads of two fingers.

Preferably, the cross-section of the first buckle is of a stair-like shape, and the cross-section of the second buckle is also of a stair-like shape.

Preferably, the connecting piece is slidably embedded in the stair-like portion of the first buckle and the stair-like portion of the second buckle, and the connecting piece serves as a hoisting structure of the entire pulley assembly.

Preferably, the brake member includes an are groove formed on the outer wall of the pulley housing, and a shift block is slidably embedded in the are groove. A blocking piece is fixedly disposed outside the shift block, and the blocking piece covers the are groove. The interior of the center plate is hollow, and a snap ring is fixedly disposed in the center plate. The axis of the snap ring intersects perpendicularly with the axis of the rotating shaft. A brake column is slidably embedded in the snap ring, and a connecting arm is hingedly provided between one end of the blocking piece extending into the interior of the central plate and one end of the brake column away from the rotating shaft. A rubber gasket is fixedly attached to one end of the brake column close to the rotating shaft, and a plurality of straight grooves that are equidistantly arranged around the circumference of the rotating shaft are provided on the outer surface of the rotating shaft. The upper and lower end faces of the are groove and the upper and lower end faces where the shift block and the are groove are engaged are respectively fixedly embedded with a magnetic insert, and two magnetic inserts distributed facing each other are magnetically attracted to each other. The magnetic insert enhances the stability of the shift block, ensuring its secure positioning at either the upper or lower end of the are groove.

Preferably, the lower end face of the gasket is provided with an annular groove, and the annular groove is distributed around the paracentral peripheral portion of the gasket. The configuration of the annular groove facilitates the direct passage of the sewing needle and thread, thereby enhancing the convenience for personnel engaged in the sewing process.

Preferably, a plurality of through holes are provided in the annular groove and are equidistantly arranged around the circumference thereof. The through holes are similar to the holes of a punched needle, which further enhances the sewing efficiency.

Preferably, the fixing seat is a threaded seat block, and the first connecting column is a threaded rod. The threaded seat block and the connecting piece are fixedly assembled, and the threaded rod is rotatably embedded inside the pulley housing. The end of the threaded rod away from the pulley housing is threadedly assembled with the threaded seat block. The pulley assembly can be threadedly assembled via the threaded rod and the threaded seat block.

Preferably, a swivel is fixedly mounted on the outer surface of the threaded rod. The swivel can facilitate a more convenient rotation of the threaded rod for the user.

Preferably, the fixing seat is a magnetic seat block, the first connecting column is a second connecting column, and the magnetic seat block and the connecting piece are fixedly assembled. The second connecting column is rotatably embedded in the interior of the pulley housing. A magnetic block is fixedly provided at one end of the second connecting column away from the pulley housing, and the magnetic block is magnetically embedded in the interior of the magnetic seat block. The pulley assembly can be magnetically assembled through the magnetic engagement between the magnetic block and the magnetic seat block, facilitating a more efficient process for both disassembly and assembly.

Preferably, the mounting ports of the magnetic block and the magnetic seat block are both of regular polygons, which can improve the stability between the magnetic block and the magnetic seat block.

Preferably, a chamfered portion is provided on one end face of the magnetic block away from the pulley housing, which enables the magnetic block to be more conveniently inserted into the interior of the magnetic seat block.

Preferably, the fastening component includes a mounting block fixedly arranged on the outer side of one end of the first buckle away from the second buckle, and the mounting block is located at the side of the first buckle away from the pulley housing. A fixing column is vertically and fixedly inserted inside the mounting block, and both ends of the fixing column are rotatably sleeved with an adapter block. One end of the two adapter blocks away from the fixing column is co-fixed with an abutting block, and the abutting block covers the end of the stair-like portion of the first buckle. A locking member is provided between one end of the fixing column and one adapter block, and a rotating member is provided between the other end of the fixing column and the other adapter block. The cover-type configuration of the abutting block facilitates a more convenient operation in comparison to the traditional method of twisting bolts.

Preferably, the locking member includes a plurality of ratchets fixedly arranged on the inner wall of one of the adapter blocks and distributed equidistantly around the circumference thereof. A clamping block is slidably assembled inside the fixing column, and the clamping block is located at one end of the fixing column close to the ratchets. The clamping block is slidably through the fixing column, and the clamping block is movably engaged with the plurality of ratchets. A sliding plate is slidably assembled inside the fixing column, and the clamping block is fixed to the sliding plate. A first spring is fixedly arranged between one end of the sliding plate away from the clamping block and the fixing column, and a pressing rod is fixedly arranged at one end of the sliding plate away from the clamping block. The pressing rod and the fixing column are vertically distributed, and the pressing rod is slidably through the mounting block and the fixing column. The movement of the clamping block is constrained by the ratchets, thereby allowing the abutting block to rotate exclusively towards the end of the first buckle.

Preferably, a coil spring is provided on the outer surface of one end of the fixing column away from the clamping block, and the inner and outer ends of the coil spring are respectively fixed to the outer surface of the fixing column and the inner surface of the adapter block. The configuration of the coil spring is capable of producing an elastic rotational force between the fixing column and the adapter block.

Preferably, the interior of the first buckle is hollow, and a hollow plate is slidably inserted inside the first buckle. A sliding rod that is slidably through the first buckle is fixedly mounted at one end of the hollow plate close to the mounting block, and a second spring is fixedly arranged between the end of the hollow plate away from the mounting block and the first buckle. A plurality of fastening rods equidistantly distributed in a straight line are slidably embedded in one end of the first buckle close to the gasket, and the end of the fastening rods close to the gasket is in movable contact with the connecting piece. The fastening rods are located in the hollow portion of the hollow plate, and the end of the fastening rods away from the connecting piece is vertically and fixedly assembled with a limiting column. An inclined groove is opened on the surface of the hollow plate, and both ends of the limiting column are slidably embedded in the inclined groove. When the sliding rod pushes the hollow plate toward the interior of the first buckle, the restriction of the limiting column by the inclined groove can allow the fastening rod to press the connecting piece.

Compared with the prior art, the portable detachable pulley of the present disclosure has the following beneficial effects.

The portable detachable pulley is designed for use both with and without the pulley assembly, depending on the particular circumstances. The processes of assembly and disassembly are highly user-friendly and do not necessitate the use of any tools.

The detachable pulley assembly enhances packaging efficiency by allowing for a more compact design, resulting in a lighter overall weight compared to conventional fixed pulley assemblies, which significantly reduces distribution costs.

In the drawings: 1, gasket; 2, first buckle; 3, second buckle; 4, fixing member; 5, annular groove; 6, through hole; 7, connecting piece; 8, fixing seat; 9, first connecting column; 10, pulley housing; 11, roller body; 12, rotating shaft; 13, center plate; 14, shift block; 15, blocking piece; 16, are groove; 17, magnetic insert; 18, snap ring; 19, brake column; 20, connecting arm; 21, straight groove; 22, threaded seat block; 23, threaded rod; 24, swivel; 25, magnetic seat block; 26, magnetic block; 27, second connecting column; 28, chamfered portion; 29, mounting block; 30, fixing column; 31, adapter block; 32, abutting block; 33, clamping block; 34, ratchet; 35, sliding plate; 36, first spring; 37, pressing rod; 38, coil spring; 39, hollow plate; 40, inclined groove; 41, fastening rod; 42, limiting column; 43, sliding rod; 44, second spring.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative efforts fall within the scope of protection of the present disclosure.

Embodiment 1

Please refer to FIGS. 1 to 5. A portable detachable pulley is provided, which includes a gasket 1, and a buckle assembly is provided on the lower end face of the gasket 1. The buckle assembly includes two symmetrically distributed first buckles 2 fixedly mounted on the lower end face of the gasket 1, and a second buckle 3 is provided between the two first buckles 2. The second buckle 3 is located at an end portion of one side of the two first buckles 2, and a fastening component is provided at the other end of the two first buckles 2. A connecting piece 7 is movably assembled between the first buckle 2 and the second buckle 3, and a pulley assembly for rolling is provided beneath the connecting piece 7.

Figure 3:
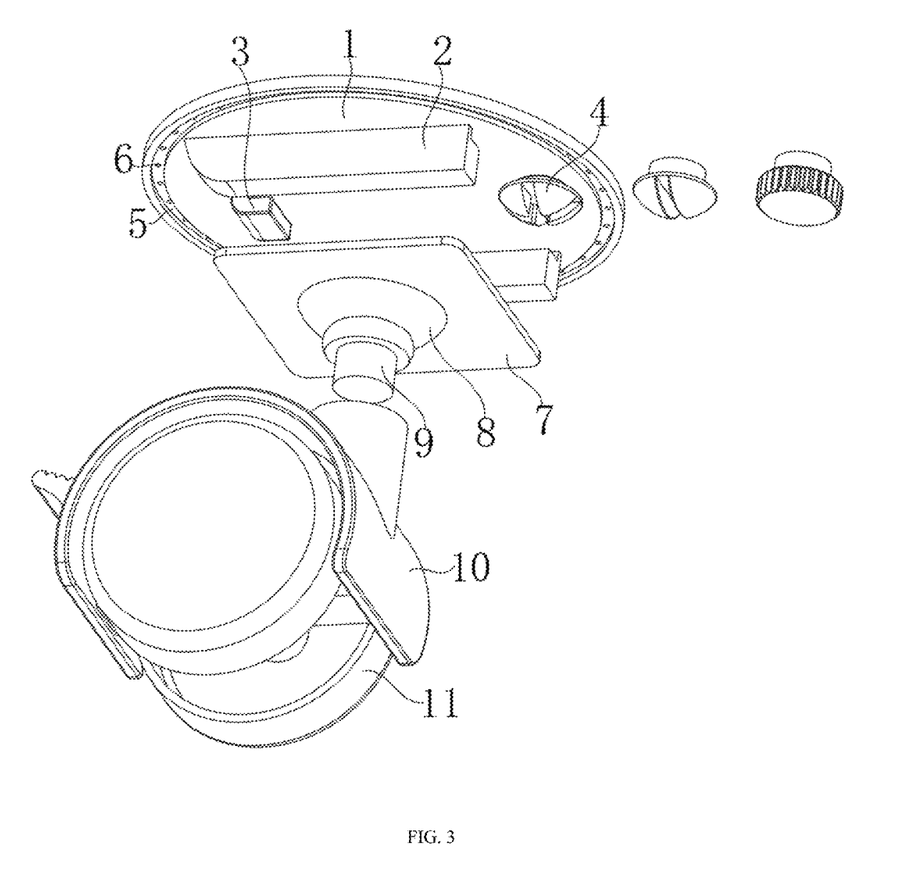
FIG. 3 is a schematic diagram of the structure of the pulley assembly according to embodiment 1 of the present disclosure.
Figure 4:
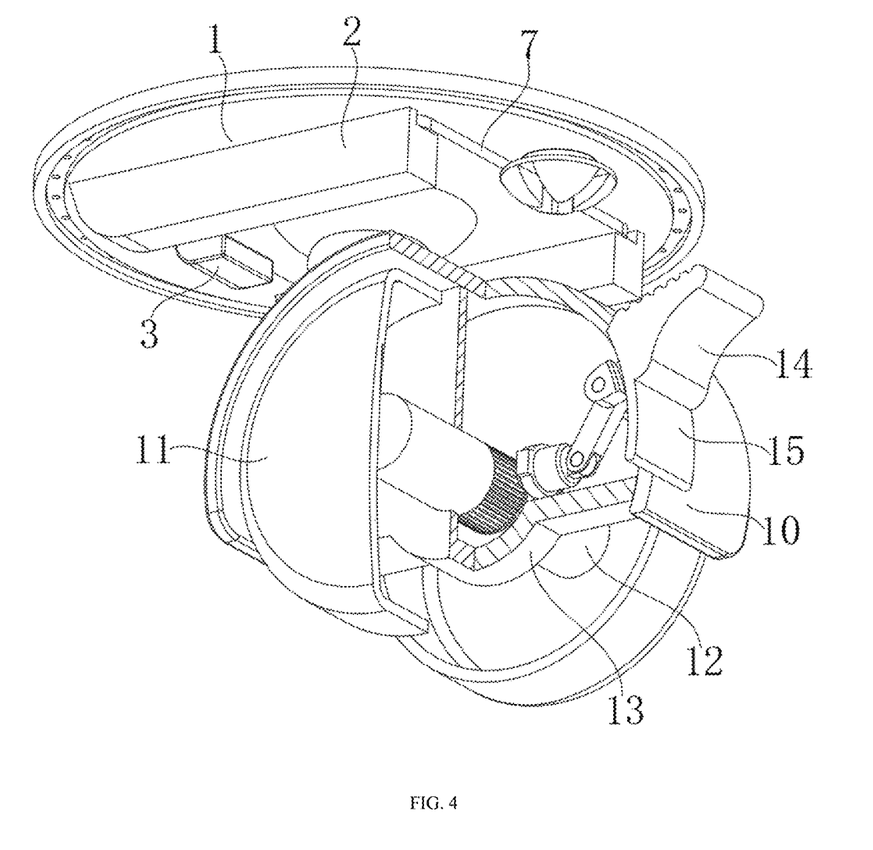
FIG. 4 is a schematic diagram of the internal structure of the center plate according to embodiment 1 of the present disclosure.

The pulley assembly includes a fixing seat 8 fixedly arranged at the bottom of the connecting piece 7, and a first connecting column 9 rotatably embedded at the bottom of the fixing seat 8. A pulley housing 10 is fixedly mounted on an end face of the first connecting column 9 away from the fixing seat 8, and a center plate 13 is fixedly arranged inside the pulley housing 10. A rotating shaft 12 is rotatably inserted in the center plate 13, and the rotating shaft 12 and the pulley housing 10 are coaxially distributed. Both ends of the rotating shaft 12 are fixedly sleeved with a roller body 11 respectively, and a brake member is arranged between the pulley housing 10 and the rotating shaft 12.

Figure 1:
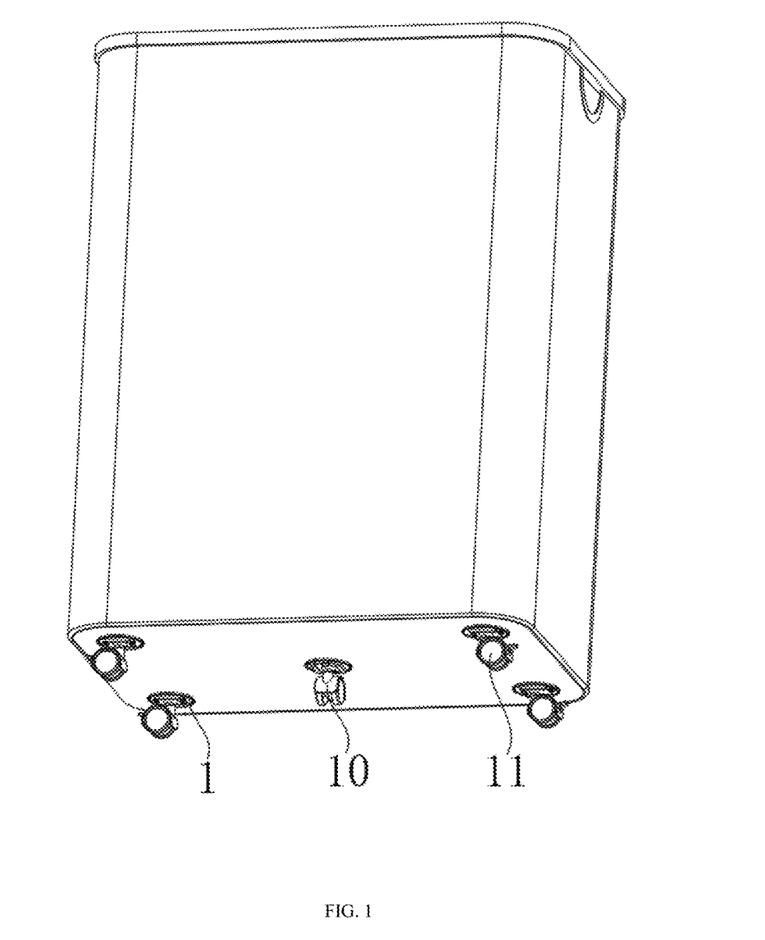
FIG. 1 is a schematic diagram of the buckle assembly applied in the laundry basket according to embodiment 1 of the present disclosure.
Figure 2:
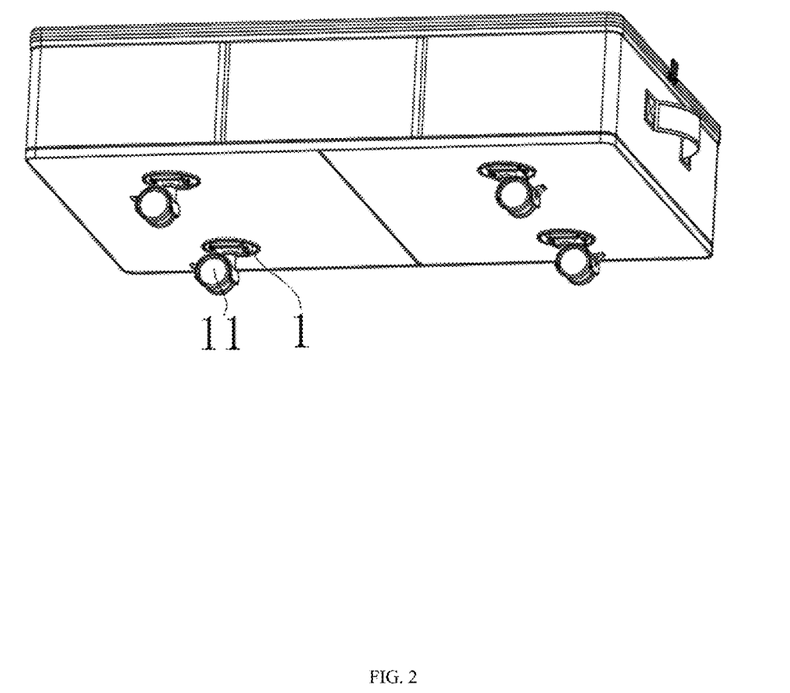
FIG. 2 is a schematic diagram of the buckle assembly applied in the storage box according to embodiment 1 of the present disclosure.

The fastening component includes a fixing member 4, which may be a cross screw, a flat screw, or a bolt. The cross screw and flat screw can be directly twisted using the fingernail cover, while the bolt can be rotated by grasping it between the pads of two fingers.

The cross-section of the first buckle 2 is of a stair-like shape, and the cross-section of the second buckle 3 is also of a stair-like shape.

The connecting piece 7 is slidably embedded in the stair-like portion of the first buckle 2 and the second buckle 3, and the connecting piece 7 serves as a hoisting structure of the entire pulley assembly.

Figure 5:
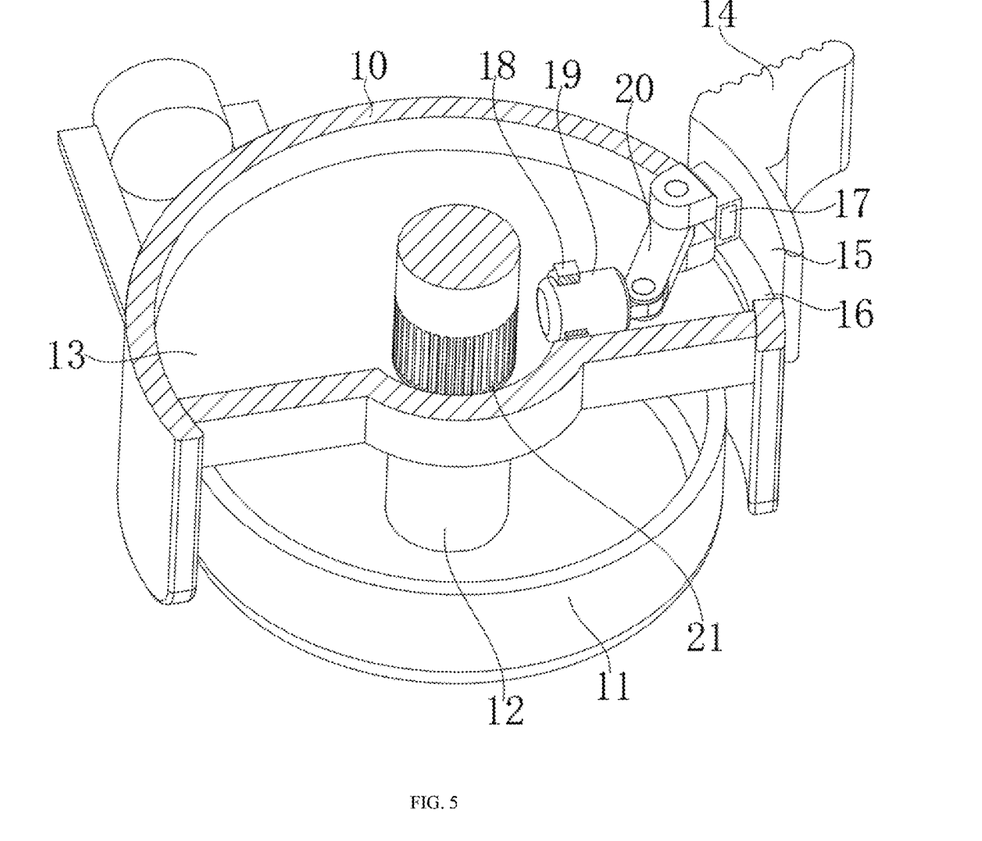
FIG. 5 is a schematic diagram of the structure of the are groove and the magnetic insert according to embodiment 1 of the present disclosure.

The brake member includes an are groove 16 formed on the outer wall of the pulley housing 10, and a shift block 14 is slidably embedded in the are groove 16. A blocking piece 15 is fixedly disposed outside the shift block 14, and the blocking piece 15 covers the are groove 16. The interior of the center plate 13 is hollow, and a snap ring 18 is fixedly disposed in the center plate 13. The axis of the snap ring 18 intersects perpendicularly with the axis of the rotating shaft 12. A brake column 19 is slidably embedded in the snap ring 18, and a connecting arm 20 is hingedly provided between one end of the blocking piece 15 extending into the interior of the central plate 13 and one end of the brake column 19 away from the rotating shaft 12. A rubber gasket is fixedly attached to one end of the brake column 19 close to the rotating shaft 12, and a plurality of straight grooves 21 that are equidistantly arranged around the circumference of the rotating shaft 12 are provided on the outer surface of the rotating shaft 12. The upper and lower end faces of the are groove 16 and the upper and lower end faces where the shift block 14 and the are groove 16 are engaged are respectively fixedly embedded with a magnetic insert 17, and two magnetic inserts 17 distributed facing each other are magnetically attracted to each other. The magnetic insert 17 enhances the stability of the shift block 14, ensuring its secure positioning at either the upper or lower end of the are groove 16.

The lower end face of the gasket 1 is provided with an annular groove 5, and the annular groove 5 is distributed around the paracentral peripheral portion of the gasket 1. The configuration of the annular groove 5 facilitates the direct passage of the sewing needle and thread, thereby enhancing the convenience for personnel engaged in the sewing process.

A plurality of through holes 6 are provided in the annular groove 5 and are equidistantly arranged around the circumference thereof. The through holes 6 are similar to the holes of a punched needle, which further enhances the sewing efficiency.

Operational Principle: The configuration of the annular groove 5 and the through hole 6 facilitates the efficient attachment of gasket 1 to the bottom of a box. During the installation of the pulley assembly, the connecting piece 7 is first inserted between the first buckle 2 and the second buckle 3. Subsequently, a cross screw, flat screw, or bolt is utilized to secure the side of the connecting piece 7 away from the second buckle 3, thereby completing the installation of the connecting piece 7. This expedited installation process enables the pulley assembly to provide the box with sliding capabilities. In specific circumstances where the pulley assembly is unnecessary, the connecting piece 7 can be easily detached using a cross screw, flat screw, or bolt, allowing for the complete disassembly of the pulley assembly. This configuration permits the selection of either wheeled or non-wheeled configurations based on particular requirements. The assembly and disassembly processes are highly convenient, requiring no tools, and the overall packaging remains compact and lightweight, thereby minimizing delivery costs.

In the operation of the pulley assembly, should it become necessary to brake the roller body 11, the user is required to simply depress the shift block 14 in a downward motion. As the shift block 14 moves under the guidance of the are groove 16, it facilitates the movement of the brake column 19 towards the rotating shaft 12 via the connecting arm 20. A rubber gasket is attached to the end of the brake column 19, and the brake column 19 presses the rubber gasket against the surface of the straight groove 21. This interaction generates a frictional force that produces a braking effect on both the rotating shaft 12 and the roller body 11.

Embodiment 2

Figure 6:
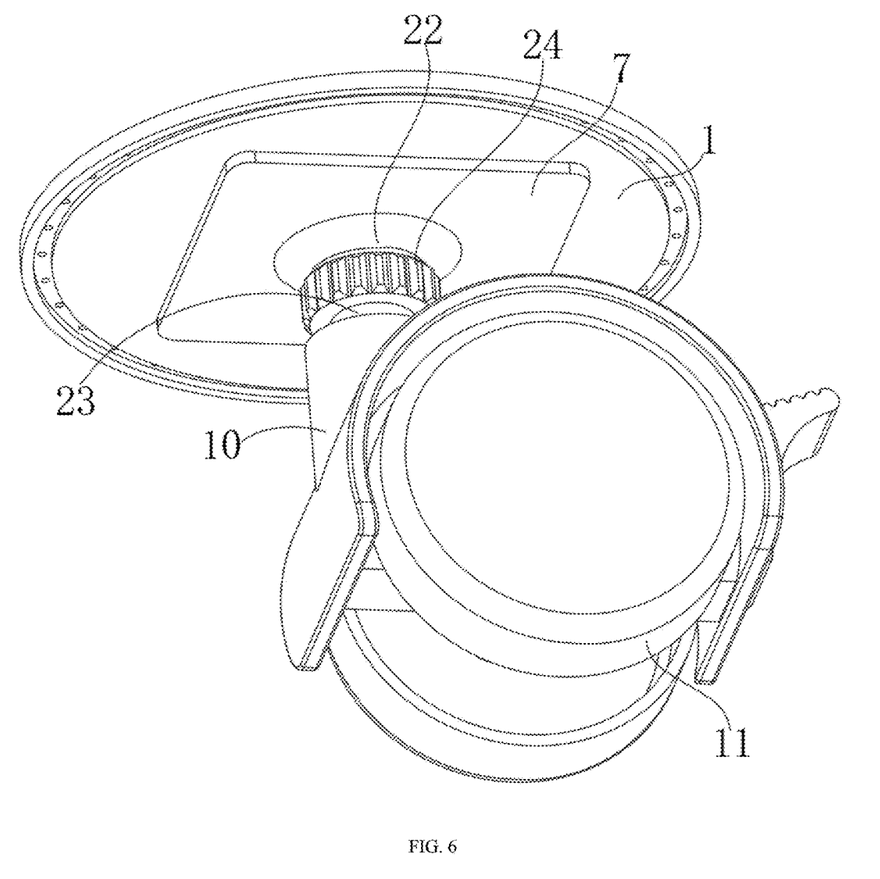
FIG. 6 is a schematic diagram of the structure of the threaded seat block and the threaded rod according to embodiment 2 of the present disclosure.
Figure 7:
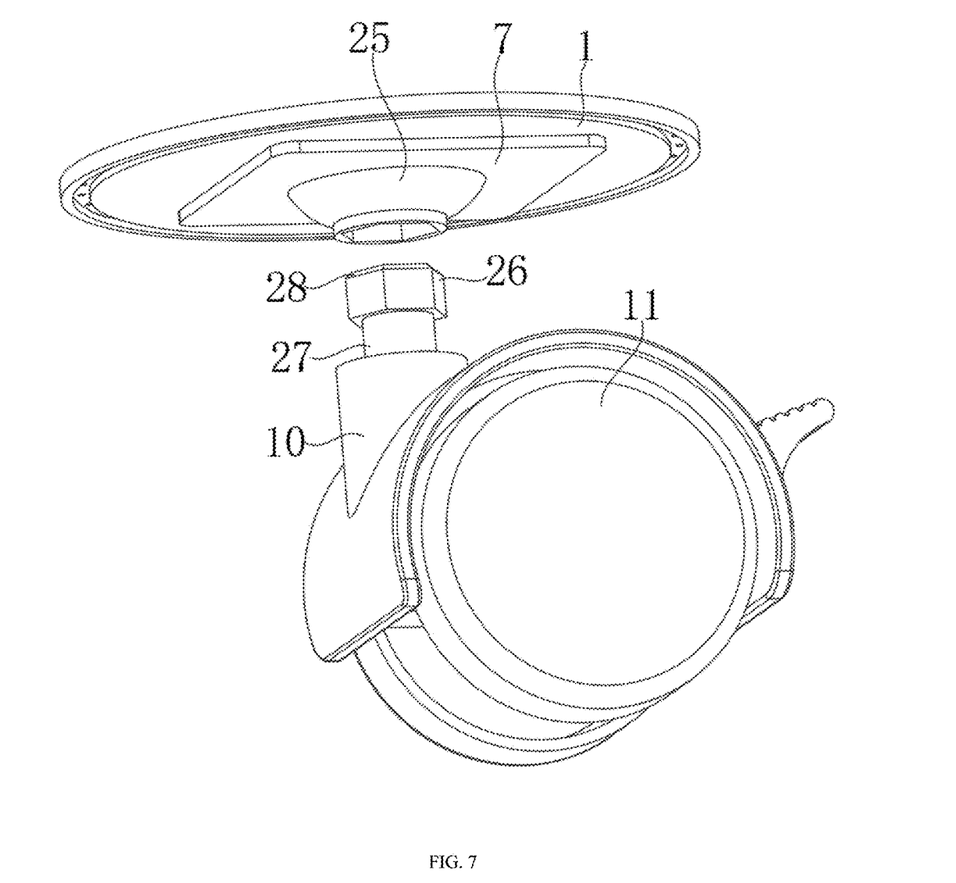
FIG. 7 is a schematic diagram of the structure of the magnetic seat block and the magnetic block according to embodiment 3 of the present disclosure.

Please refer to FIGS. 6 and 7. This embodiment further illustrates embodiment 1. The fixing seat 8 is a threaded seat block 22, and the first connecting column 9 is a threaded rod 23. The threaded seat block 22 and the connecting piece 7 are fixedly assembled, and the threaded rod 23 is rotatably embedded inside the pulley housing 10. The end of the threaded rod 23 away from the pulley housing 10 is threadedly assembled with the threaded seat block 22. The pulley assembly can be threadedly assembled via the threaded rod 23 and the threaded seat block 22.

A swivel 24 is fixedly mounted on the outer surface of the threaded rod 23. The swivel 24 can facilitate a more convenient rotation of the threaded rod 23 for the user.

In the present disclosure, the relationship between the pulley housing 10 and the connecting piece 7 can alternatively be represented through a threaded assembly manner, which eliminates the necessity of disassembling the connecting piece 7, as well as the requirement to twist a cross screw, flat screw, or bolt.

Embodiment 3

Please refer to FIG. 7. This embodiment further illustrates embodiment 1. The fixing seat 8 is a magnetic seat block 25, the first connecting column 9 is a second connecting column 27, and the magnetic seat block 25 and the connecting piece 7 are fixedly assembled. The second connecting column 27 is rotatably embedded in the interior of the pulley housing 10. A magnetic block 26 is fixedly provided at one end of the second connecting column 27 away from the pulley housing 10, and the magnetic block 26 is magnetically embedded in the interior of the magnetic seat block 25. The pulley assembly can be magnetically assembled through the magnetic engagement between the magnetic block 26 and the magnetic seat block 25, thereby facilitating a more efficient process for both disassembly and assembly.

The mounting ports of the magnetic block 26 and the magnetic seat block 25 are both of regular polygons, which can improve the stability between the magnetic block 26 and the magnetic seat block 25.

A chamfered portion 28 is provided on one end face of the magnetic block 26 away from the pulley housing 10, which enables the magnetic block 26 to be more conveniently inserted into the interior of the magnetic seat block 25.

In the present disclosure, the configuration of the magnetic seat block 25 and the magnetic block 26 facilitates the disassembly and assembly of the pulley assembly through a magnetic plugging and unplugging manner.

Embodiment 4

Figure 8:
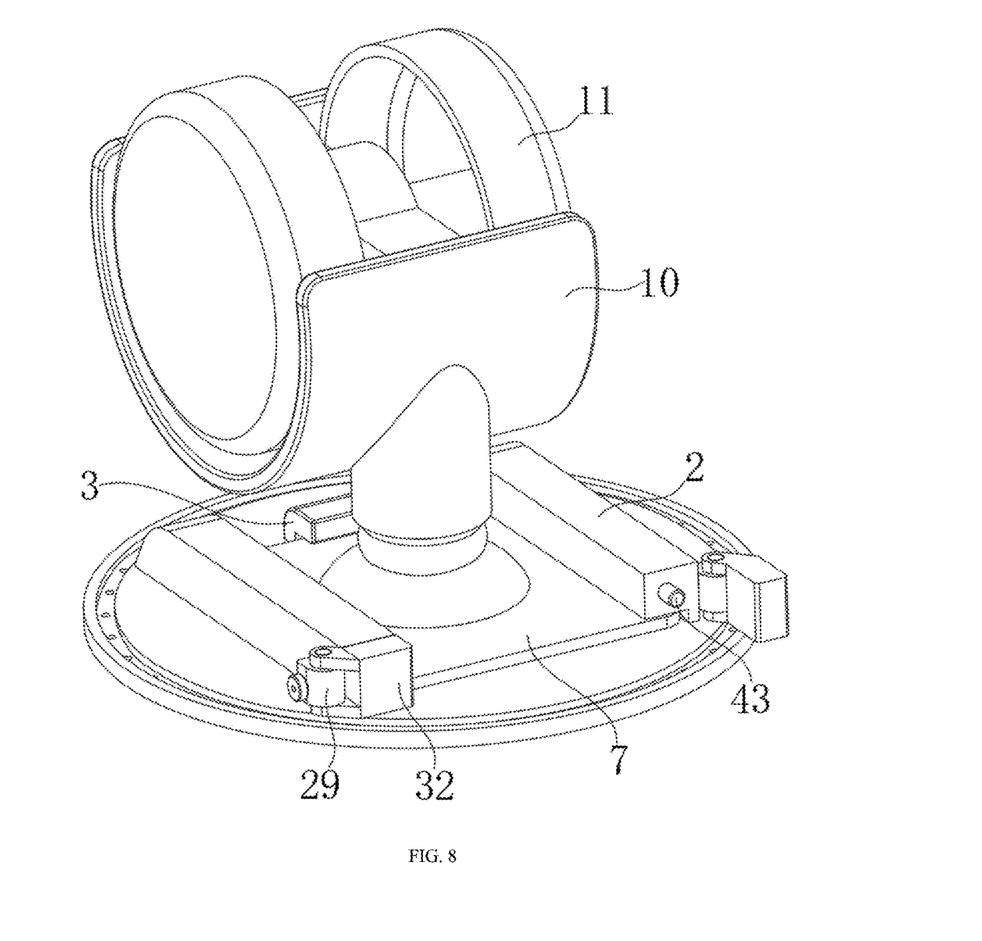
FIG. 8 is a schematic diagram of the position distribution structure of the abutting block according to embodiment 4 of the present disclosure.
Figure 9:
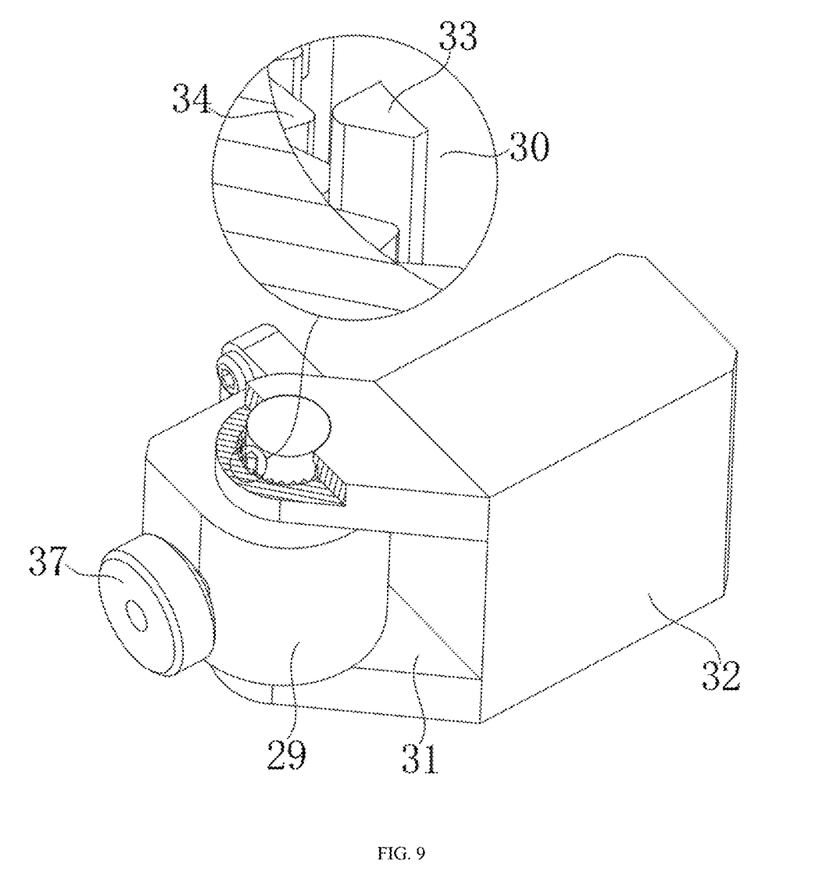
FIG. 9 is a schematic diagram of the structure of the clamping block and the ratchet according to embodiment 4 of the present disclosure.
Figure 10:
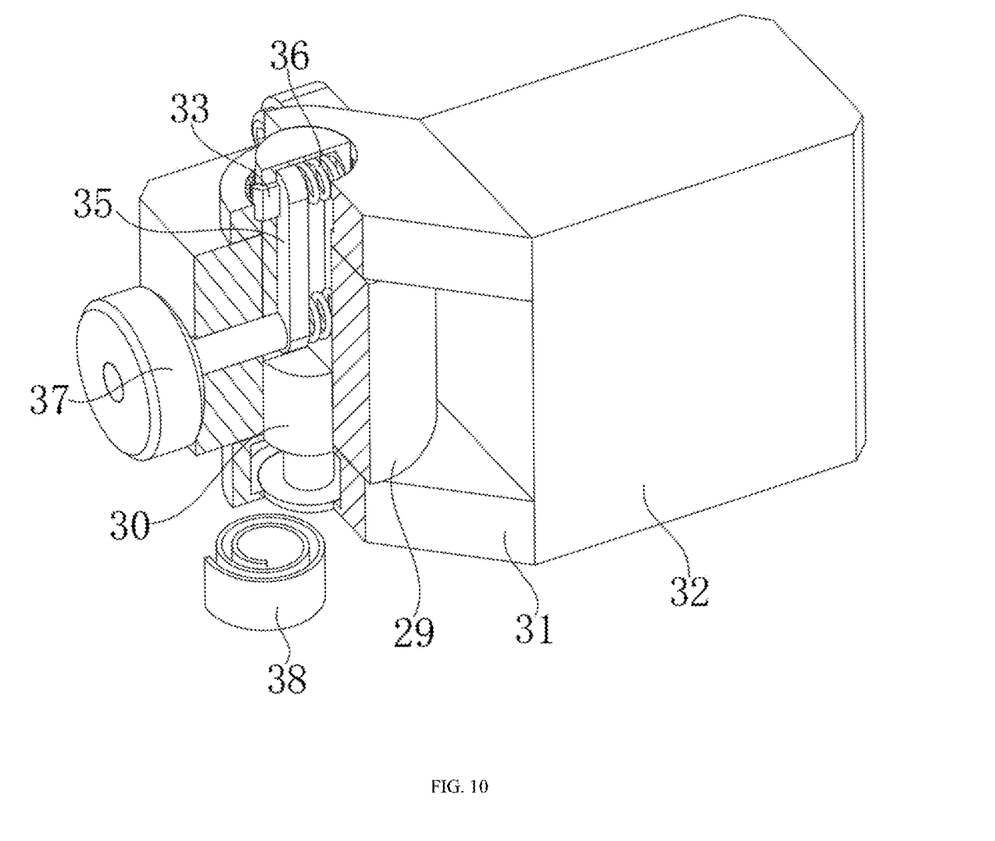
FIG. 10 is a schematic diagram of the internal structure of the mounting block and the fixing column according to embodiment 4 of the present disclosure.

Please refer to FIGS. 8 to 10. This embodiment further illustrates embodiment 1. The fastening component includes a mounting block 29 fixedly arranged on the outer side of one end of the first buckle 2 away from the second buckle 3, and the mounting block 29 is located at the side of the first buckle 2 away from the pulley housing 10. A fixing column 30 is vertically and fixedly inserted inside the mounting block 29, and both ends of the fixing column 30 are rotatably sleeved with an adapter block 31 respectively. One end of the two adapter blocks 31 away from the fixing column 30 is co-fixed with an abutting block 32, and the abutting block 32 covers the end of the stair-like portion of the first buckle 2. A locking member is provided between one end of the fixing column 30 and one adapter block 31, and a rotating member is provided between the other end of the fixing column 30 and the other adapter block 31. The cover-type configuration of the abutting block 32 facilitates a more convenient operation in comparison to the traditional method of twisting bolts.

The locking member includes a plurality of ratchets 34 fixedly arranged on the inner wall of one of the adapter blocks 31 and distributed equidistantly around the circumference thereof. A clamping block 33 is slidably assembled inside the fixing column 30, and the clamping block 33 is located at one end of the fixing column 30 close to the ratchets 34. The clamping block 33 is slidably through the fixing column 30, and the clamping block 33 is movably engaged with the plurality of ratchets 34. A sliding plate 35 is slidably assembled inside the fixing column 30, and the clamping block 33 is fixed to the sliding plate 35. A first spring 36 is fixedly arranged between one end of the sliding plate 35 away from the clamping block 33 and the fixing column 30, and a pressing rod 37 is fixedly arranged at one end of the sliding plate 35 away from the clamping block 33. The pressing rod 37 and the fixing column 30 are vertically arranged, and the pressing rod 37 is slidably through the mounting block 29 and the fixing column 30. The movement of the clamping block 33 is constrained by the ratchets 34, thereby allowing the abutting block 32 to rotate exclusively towards the end of the first buckle 2.

A coil spring 38 is provided on the outer surface of one end of the fixing column 30 away from the clamping block 33, and the inner and outer ends of the coil spring 38 are respectively fixed to the outer surface of the fixing column 30 and the inner surface of the adapter block 31. The configuration of the coil spring 38 is capable of producing an elastic rotational force between the fixing column 30 and the adapter block 31.

In the present disclosure, a limiting structure can be provided at both ends of the first buckle 2 to impose a dual restriction on the connecting piece 7. Specifically, when the connecting piece 7 is inserted between the first buckle 2 and the second buckle 3, the user rotates the two abutting blocks 32 towards the end of the first buckle 2. The ratchets 34's restriction on the clamping block 33 effectively prevents the abutting block 32 from rotating back, thereby ensuring the stability of the restriction on the connecting piece 7 by the abutting blocks 32.

When the rotation of the abutting block 32 restricts the connecting piece 7, the coil spring 38 will experience elastic deformation. To detach the connecting piece 7, the user simply needs to press the pressing rod 37, which will retract the clamping block 33 into the fixing column 30. Consequently, the mounting block 29 will no longer be constrained. Additionally, when the coil spring 38 returns to its original state, the abutting block 32 will be automatically disengaged.

Embodiment 5

Figure 11:
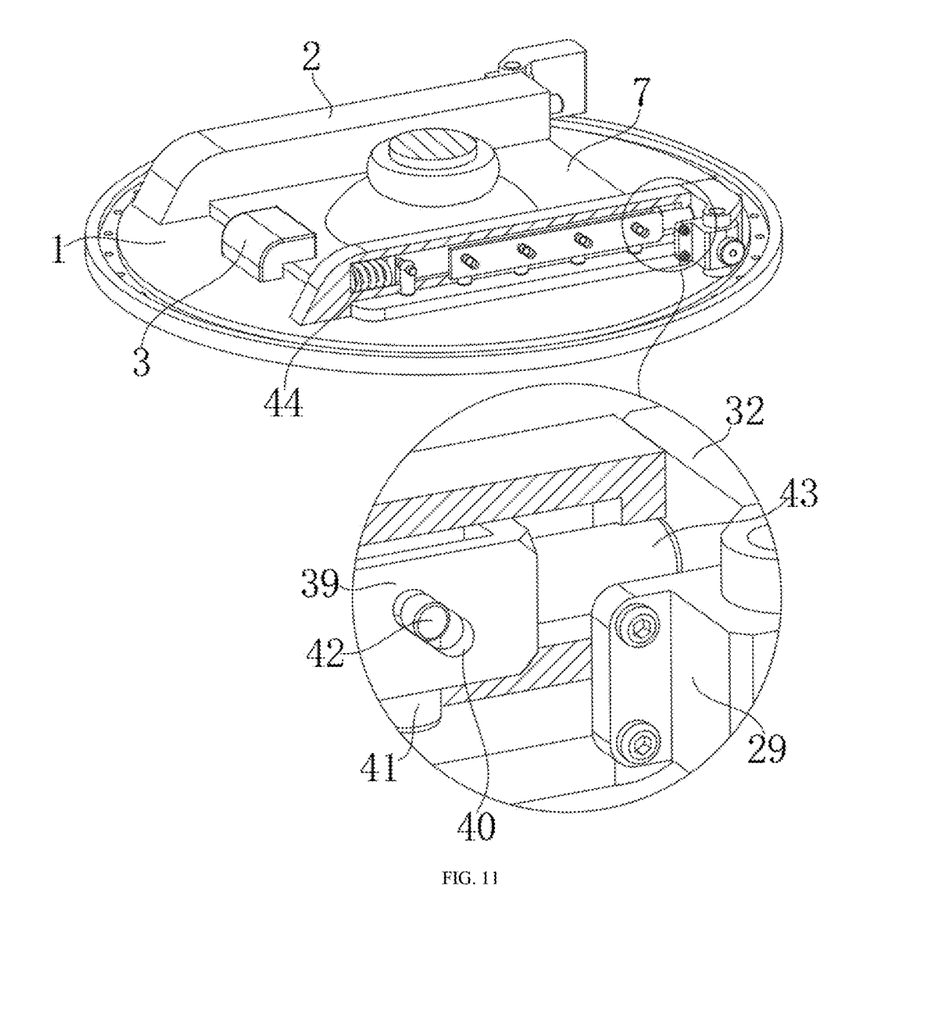
FIG. 11 is a schematic diagram of the internal structure of the first buckle according to embodiment 5 of the present disclosure.

Please refer to FIG. 11. This embodiment further illustrates embodiment 4. The interior of the first buckle 2 is hollow, and a hollow plate 39 is slidably inserted inside the first buckle 2. A sliding rod 43 that is slidably through the first buckle 2 is fixedly mounted at one end of the hollow plate 39 close to the mounting block 29, and a second spring 44 is fixedly arranged between the end of the hollow plate 39 away from the mounting block 29 and the first buckle 2. A plurality of fastening rods 41 equidistantly distributed in a straight line are slidably embedded in one end of the first buckle 2 close to the gasket 1, and the end of the fastening rod 41 close to the gasket 1 is in movable contact with the connecting piece 7. The fastening rods 41 are located in the hollow portion of the hollow plate 39, and the end of the fastening rods 41 away from the connecting piece 7 is vertically and fixedly assembled with a limiting column 42. An inclined groove 40 is opened on the surface of the hollow plate 39, and both ends of the limiting column 42 are slidably embedded in the inclined groove 40.

In the present disclosure, when the abutting block 32 is covered over the end of the first buckle 2, it will activate the sliding rod 43 to push the hollow plate 39 into the first buckle 2. The limitation of the inclined groove 40 by the inclined groove 40 facilitates the movement of the fastening rod 41 towards the connecting piece 7.

Due to the existing gap between the connecting piece 7 and the first buckle 2 as well as the second buckle 3, the connection between the connecting piece 7 and the gasket 1 is not sufficiently secure. When the fastening rod 41 is activated to exert pressure on the connecting piece 7, it facilitates a tighter connection between the connecting piece 7 and the gasket 1, which contributes to the overall stability of the pulley assembly.

It is important to clarify that in this disclosure, relational terms such as "first," "second," and similar designations are employed solely for the purpose of differentiating one entity or operation from another. These terms do not necessarily indicate or imply any actual relationship or sequence among the entities or operations referenced. Furthermore, the terms "include," "comprise," and their variants are intended to denote non-exclusive inclusion. Consequently, a process, method, article, or device that encompasses a series of elements is understood to include not only those specified elements but also additional elements that are not explicitly mentioned, as well as elements that are inherent to the process, method, article, or device in question.

While the embodiments of the present disclosure have been illustrated and described, it is acknowledged by those skilled in the art that various alterations, modifications, substitutions, and variations may be made to these embodiments without deviating from the underlying principles and essence of the present disclosure. The scope of the present disclosure is defined by the appended claims and their equivalents.

What is claimed is:

1. A portable detachable pulley, comprising a gasket, wherein
   a buckle assembly is provided on a lower end face of the gasket;
   the buckle assembly comprising two first buckles that are symmetrically arranged and fixedly mounted on the lower end face of the gasket;
   a second buckle being provided between the two first buckles and located at one end portion of one side of the two first buckles, with a fastening component provided at another end portion of the two first buckles;
   a connecting piece being movably assembled between the two first buckles, with a pulley assembly for rolling being provided beneath the connecting piece;
   the pulley assembly comprises a fixing seat fixedly arranged at a bottom of the connecting piece, and a first connecting column rotatably embedded at a bottom of the fixing seat; a pulley housing being fixedly assembled on an end face of the first connecting column away from the fixing seat, and a center plate being fixedly arranged inside the pulley housing; a rotating shaft being rotatably inserted in the center plate, and the rotating shaft and the pulley housing being coaxially arranged; both ends of the rotating shaft being fixedly sleeved with a roller body, respectively, and a brake member being arranged between the pulley housing and the rotating shaft.

2. The portable detachable pulley of claim 1, wherein the fastening component comprises a fixing member, which is a cross screw, a flat screw, or a bolt.

3. The portable detachable pulley of claim 1, wherein a cross-section of each of the two first buckles and a cross-section of the second buckle are both of a stair-like shape.

4. The portable detachable pulley of claim 3, wherein the connecting piece is slidably embedded in stair-like portions of the two first buckles and a stair-like portion of the second buckle.

5. The portable detachable pulley of claim 1, wherein the brake member comprises an arc groove provided on an outer wall of the pulley housing, with a shift block slidably embedded in the arc groove; a blocking piece being fixedly provided outside the shift block, and the blocking piece covering the arc groove; an interior of the center plate being hollow, and a snap ring being fixedly provided inside the center plate; an axis of the snap ring intersecting perpendicularly with that of the rotating shaft; a brake column being slidably embedded in the snap ring, and a connecting arm being hingedly provided between one end of the blocking piece extending into the interior of the central plate and one end of the brake column away from the rotating shaft;
   a rubber gasket being fixedly attached to one end of the brake column close to the rotating shaft, and a plurality of straight grooves that are equidistantly arranged around a circumference of the rotating shaft are provided on an outer surface of the rotating shaft;
   an upper and lower end faces of the arc groove and an upper and lower end faces where the shift block and the arc groove are engaged being respectively fixedly embedded with a magnetic insert, and two magnetic inserts facing each other being magnetically attracted to each other.

6. The portable detachable pulley of claim 1, wherein the lower end face of the gasket is provided with an annular groove disposed around a paracentral peripheral portion of the gasket.

7. The portable detachable pulley of claim 6, wherein a plurality of through holes are provided in the annular groove and are equidistantly arranged around a circumference thereof.

8. The portable detachable pulley of claim 1, wherein the fixing seat is a threaded seat block, and the first connecting column is a threaded rod; the threaded seat block and the connecting piece being fixedly assembled, and the threaded rod being rotatably embedded inside the pulley housing; one end of the threaded rod away from the pulley housing being threadedly assembled with the threaded seat block.

9. The portable detachable pulley of claim 8, wherein a swivel is fixedly sleeved on an outer surface of the threaded rod.

10. The portable detachable pulley of claim 1, wherein the fixing seat is a magnetic seat block, and the first connecting column is a second connecting column; the magnetic seat block and the connecting piece being fixedly assembled; the second connecting column being rotatably embedded inside the pulley housing; a magnetic block being fixedly provided at one end of the second connecting column away from the pulley housing, and the magnetic block being magnetically embedded inside the magnetic seat block.

11. The portable detachable pulley of claim 10, wherein mounting ports of the magnetic block and the magnetic seat block are both of regular polygons.

12. The portable detachable pulley of claim 11, wherein a chamfered portion is provided on one end face of the magnetic block away from the pulley housing.

13. The portable detachable pulley of claim 1, wherein the fastening component comprises a mounting block fixedly arranged on an outer side of one end of each of the two first buckles away from the second buckle, and the mounting block is located at one side of each of the two first buckles away from the pulley housing; a fixing column being vertically and fixedly inserted inside the mounting block, and two adapter blocks are rotatably sleeved on both ends of the fixing column, respectively; one end of the two adapter blocks away from the fixing column being co-fixed with an abutting block, and a stair-like portion of each of the two first buckles is covered by the abutting block; a locking member being provided between one end of the fixing column and one adapter block of the two adapter blocks, and a rotating member being provided between another end of the fixing column and another adapter block of the two adapter blocks.

14. The portable detachable pulley of claim 13, wherein the locking member comprises a plurality of ratchets fixedly arranged on the inner wall of one of the two adapter blocks and equidistantly arranged around the circumference thereof; a clamping block being slidably assembled inside the fixing column, and the clamping block being located at one end of the fixing column close to the ratchets; the clamping block being slidably through the fixing column, and being movably engaged with the plurality of ratchets; a sliding plate being slidably assembled inside the fixing column, and the clamping block being fixed to the sliding plate; a first spring being fixedly arranged between one end of the sliding plate away from the clamping block and the fixing column, and a pressing rod being fixedly arranged at one end of the sliding plate away from the clamping block; the pressing rod and the fixing column being vertically arranged, and the pressing rod being slidably through the mounting block and the fixing column.

15. The portable detachable pulley of claim 14, wherein a coil spring is provided on an outer surface of one end of the fixing column away from the clamping block, and an inner and outer ends of the coil spring are respectively fixed to the outer surface of the fixing column and an inner surface of an other one of the two adapter blocks.

16. The portable detachable pulley of claim 13, wherein an interior of each of the two first buckles is hollow, with a hollow plate slidably inserted inside each of the two first buckles; a sliding rod that is slidably through each of the two first buckles being fixedly mounted at one end of the hollow plate close to the mounting block, and between each of the two first buckles and one end of the hollow plate away from the mounting block is provided with a second spring; a plurality of fastening rods that are equidistantly arranged in a straight line being slidably embedded in one end of each of the two first buckles close to the gasket, and one end of the fastening rods close to the gasket being in movable contact with the connecting piece; the fastening rods being located in a hollow portion of the hollow plate, and one end of the fastening rods away from the connecting piece being vertically and fixedly assembled with a limiting column; an inclined groove being opened on a surface of the hollow plate, and both ends of the limiting column being slidably embedded in the inclined groove.

\* \* \* \* \*